US007113150B2

(12) United States Patent
Thomason

(10) Patent No.: US 7,113,150 B2
(45) Date of Patent: Sep. 26, 2006

(54) DIRECTIONAL IMAGE DISPLAY

(75) Inventor: Graham G Thomason, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 109 days.

(21) Appl. No.: 10/305,553

(22) Filed: Nov. 27, 2002

(65) Prior Publication Data

US 2003/0222978 A9 Dec. 4, 2003

(30) Foreign Application Priority Data

Dec. 4, 2001 (GB) ................................ 0128983.4

(51) Int. Cl.
*G09G 5/00* (2006.01)
(52) U.S. Cl. .......................... 345/6; 455/456; 359/460
(58) Field of Classification Search ................ 455/456; 359/460–463; 345/6
See application file for complete search history.

(56) References Cited

U.S. PATENT DOCUMENTS

| 4,670,798 A | 6/1987 | Campbell et al. ............. 360/12 |
| 5,923,252 A | 7/1999 | Sizer et al. .............. 340/573.1 |
| 6,064,424 A | 5/2000 | van Berkel et al. ........... 348/51 |
| 6,118,584 A | 9/2000 | Van Berkel et al. ......... 359/463 |
| 6,163,336 A | 12/2000 | Richards ...................... 348/42 |
| 6,173,239 B1 | 1/2001 | Ellenby ...................... 702/150 |
| 6,236,330 B1 | 5/2001 | Cohen ..................... 340/691.6 |
| 2002/0032035 A1* | 3/2002 | Teshima ..................... 455/456 |

FOREIGN PATENT DOCUMENTS

| EP | 0833183 A1 | 4/1998 |
| EP | 0946066 A1 | 9/1999 |
| EP | 1120706 A2 | 8/2001 |
| FR | 2768877 A1 | 3/1999 |
| GB | 2344009 | 5/2000 |
| WO | WO0068924 | 11/2000 |
| WO | WO0161671 | 8/2001 |
| WO | WO0225624 | 3/2002 |

* cited by examiner

*Primary Examiner*—Sumati Lefkowitz
*Assistant Examiner*—Ke Xiao
(74) *Attorney, Agent, or Firm*—Michael E. Belk

(57) ABSTRACT

Apparatus for displaying an image, including a receiver for receiving data having the location of a first object and for receiving data having the location of a second object. A display is configured for displaying first and second images, and a directing device is configured for directing the first image towards the location of the first object and for directing the second image towards the location of the second object.

20 Claims, 3 Drawing Sheets

DIRECTIONAL IMAGE DISPLAY

This invention relates to a method and apparatus for displaying an image. In particular, it relates to the receiving of data comprising the location of a first object, and to the receiving of data comprising the location of a second object, and to directing a first image towards the location of the first object, and directing a second image towards the location of the second object.

It is known to provide hoardings that display advertisements, in the form of images, for viewing by the general public. Such advertisements are, however, indiscriminate and most advertisements carried in this way are of no interest to the majority of the people who are exposed to them. It is also known to provide more personalised advertisements, as images, to mobile devices that users are carrying, for example sending details of new product releases to a user's mobile phone. However the present mobile devices do not have display functionality beyond a basic level and so cannot support anything other than a very simple advertisement.

It is therefore an object of the invention to improve on the known methods of displaying images to a user, and to facilitate the display of multiple images to multiple users in an efficient manner.

According to a first aspect of the invention, there is provided a method of displaying an image, comprising receiving data comprising the location of a first object, receiving data comprising the location of a second object, directing a first image towards the location of said first object, and directing a second image towards the location of said second object.

According to a second aspect of the invention, there is provided apparatus for displaying an image, comprising receiving means for receiving data comprising the location of a first object and for receiving data comprising the location of a second object, display means for displaying first and second images, and directing means for directing said first image towards the location of said first object and for directing said second image towards the location of said second object Owing to the invention, it is possible to display a first image directed towards a first object and to display a second image directed towards a second object, thereby delivering images directly to users, but using a greater display functionality than is possible with a mobile device. This gives the ability to target users in their environment, with large screens, rather than on their tiny mobile phone display, with the increased chance of making an impact.

Advantageously, the first image and the second image are displayed simultaneously. Preferably, communicating means for communicating with the or each object is provided for interrogating (and/or for receiving feedback from) the or each object and selecting the or each image accordingly. Additionally detecting means for detecting the location of the or each object may be provided.

The apparatus may include a display capable of beaming pixels in at least two directions. A user with a mobile phone (or similar device) within range of the apparatus has their position determined (by GPS or locally). The apparatus is provided with the user's position and can access the user's profile, if one is available. The apparatus, knowing the position of the display, and therefore the angle from display to user, addresses the display with an image. This results in the targeting of the user with that image. If the user's profile has been accessed, then something relevant to that user can be displayed. Similarly, a second user, in a different position, can be targeted with a different image at the same time, by the same display.

An embodiment of the invention will now be described, by way of example only, with reference to the accompanying drawings in which.

Figure 1:
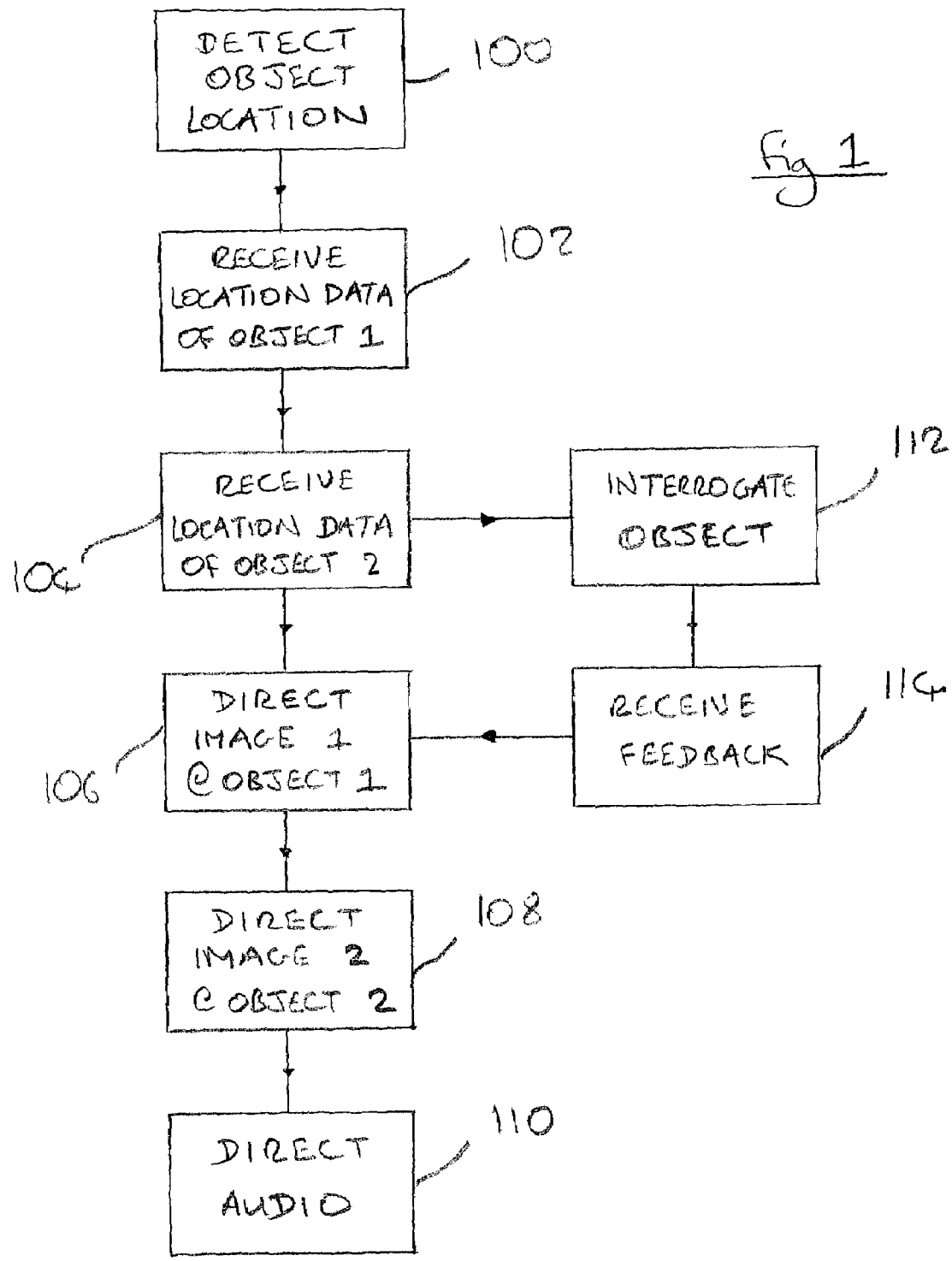
FIG. 1 is a flow chart of a method of displaying an image.

FIG. 1 shows a flow chart of the method of displaying an image. The steps 102, 104, 106 and 108 are the core steps of the method, the steps 100, 110, 112 and 114 are each additional steps that may be used to enhance the functionality of the display method.

Figure 2:
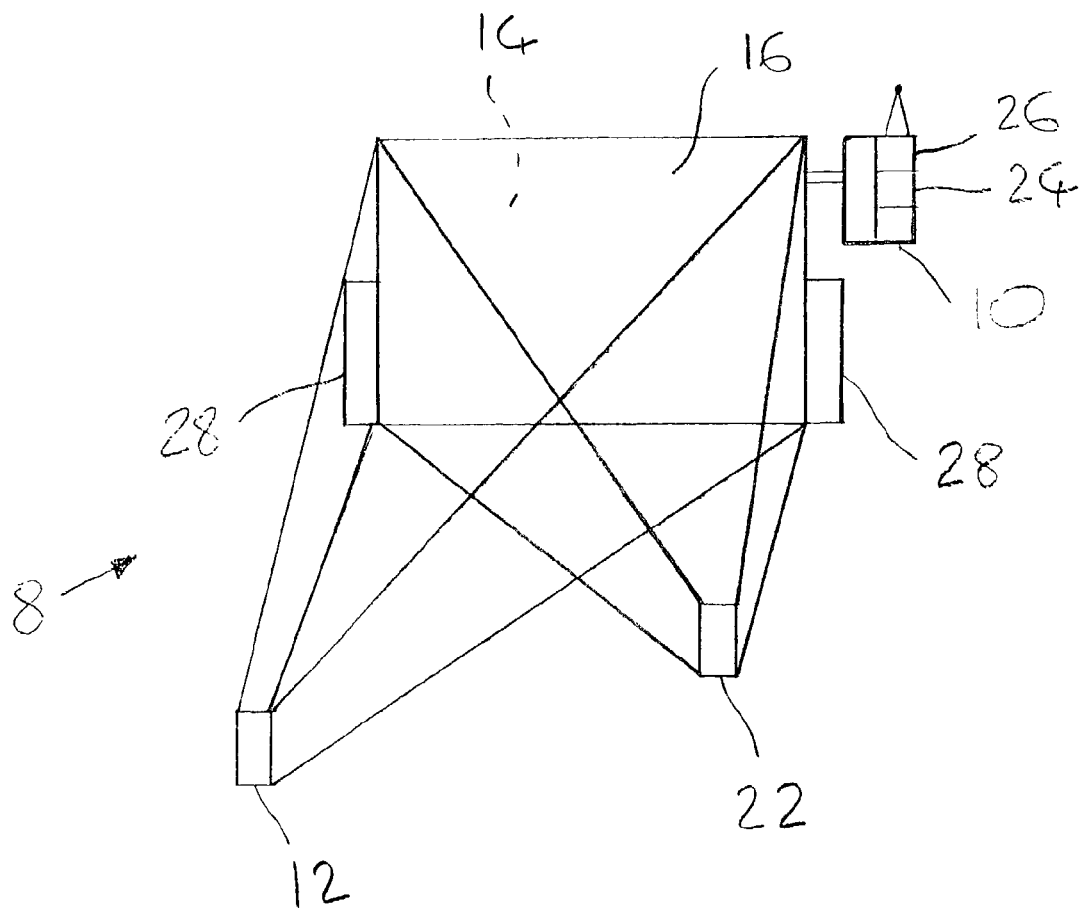
FIG. 2 is a schematic perspective view of apparatus for displaying an image.

In FIG. 2, the apparatus 8 for displaying an image comprises receiving means 10 for receiving data comprising the location of a first object 12 (method step 102), which would typically be a mobile phone in the possession of a user. The location of the object 12 is determined using well-known global positioning system (GPS) technology.

The apparatus 8 further includes display means 14 in the form of a liquid crystal display (LCD) for displaying a first image. The LCD comprises pixels 18 (shown in more detail in FIG. 3). Overlying the display means 14 is directing means 16 in the form of a lenticular lens array. Such an LCD and lenticular lens array arrangement is well known in the field of autostereoscopic displays, as described in, for example, U.S. Pat. No. 6,064,424 and U.S. Pat. No. 6,118,584, incorporated herein by reference.

The directing means 16 is for directing the image towards the location of the object 12 (method step 106). For example, if a user with a mobile phone is within range of the apparatus 8 then their location, as determined by GPS, is received by the receiving means 10. The apparatus 8, which is designed as an advertising billboard, can then target the user with an advertisement, by directing the image displayed on the display means 14 to the location of the user.

Figure 3:
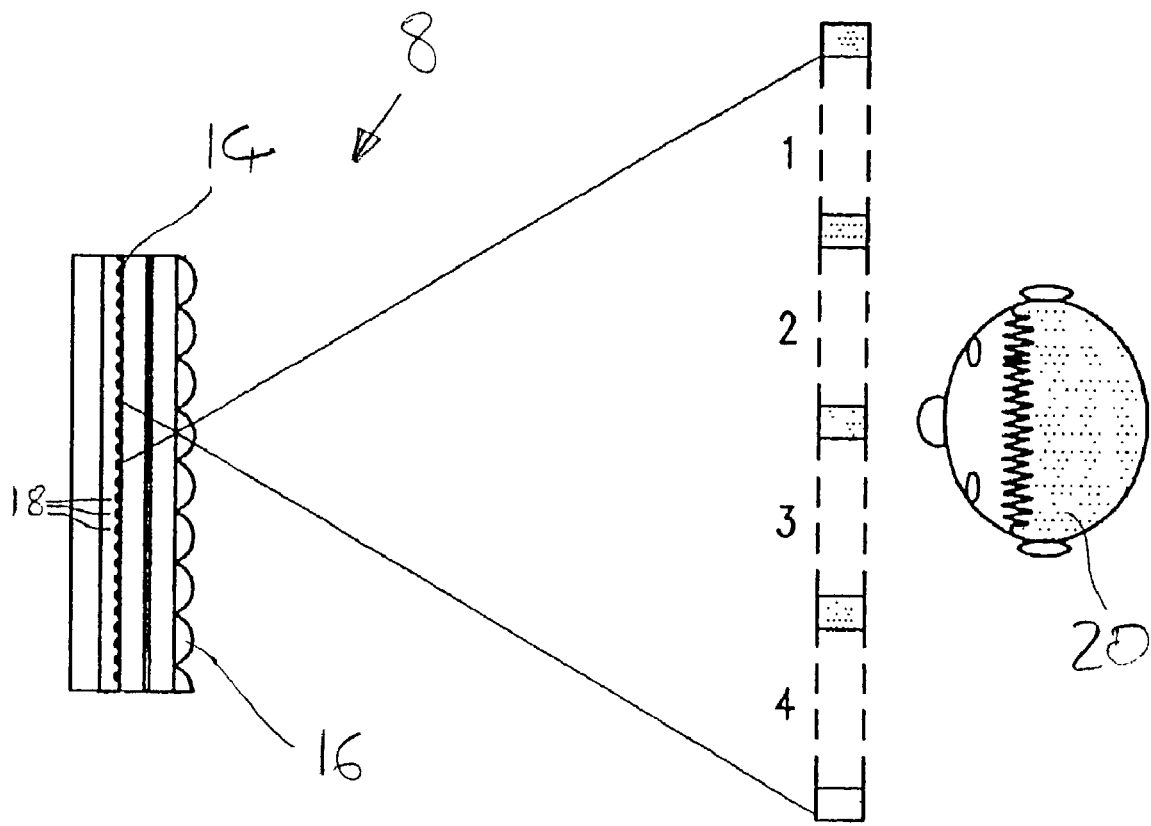
FIG. 3 is a plan view of a section of the apparatus of FIG. 2, showing a user of the apparatus.

As shown in FIG. 3, the lenticular lens array overlying the display means 14 directs individual columns of pixels outward. Such columns, when added together by a user's eyes, create an image that can only be seen in a particular location in front of the display means 14. To direct the image to a known point, the addressing of the individual pixels is controlled such that the addressed pixels lie behind the individual lenses of the lens array, the curvature of the individual lenses directing them in the required direction. In FIG. 3, a user 20, depending upon his position relative to the numbered views 1 to 4, will receive an image from the display means 14.

The receiving means 10 also receives data comprising the location of a second object 22 (method step 104), which like the first object 12 could be, for example, a mobile phone. The display means 14 displays a second image and the directing means 16 directs the second image towards the location of the second object 22 (method step 108). In this way, the display means 14 displays the first image and the second image simultaneously. This can be easily understood with reference to FIG. 3, in that in the different views 1 to 4, different images are displayed in each view, so that a user will see a different image depending upon their location.

This allows the advertising billboard to direct different messages to different users, with the advantages of a large display area for supporting the advertisement coupled with the possibility of targeting a particular user. This is achieved by the apparatus 8, which includes communicating means 24 for communicating with the objects 12 and 22 (or indeed with just a single object as appropriate). Typically this would be to interrogate the object (method step 112) and accordingly select the image to be directed at the object.

If a user has a mobile device that is provided with some kind of profile functionality, then this is interrogated by the communicating means 24 via a local radio frequency link, which may be of the Bluetooth standard, or any similar local area network standard. For example, the billboard may be programmed to display holiday advertisements. When an object enters the range of the billboard, the communicating means 24 interrogates the profile stored on the object to determine information about the user's preferences. This may be by directly accessing relevant information, such as the user's previous holidays or may be inferred from information in the profile, such as the user's taste in music or leisure activities. If the user previously travelled to Ayia Napa or recently purchased the latest dance music CD then an advertisement for a holiday in Ibiza will be selected as the image to be displayed and directed at the user. Alternatively if the user previously travelled to Prague or purchased the latest opera CD then an advertisement for a holiday in Vienna will be displayed and directed to the user. In this way relevant information is targeted at the user but a large display surface is utilised for the presentation of the image.

The communicating means 24 can also (or alternatively) be used for receiving feedback from the objects 12 and 22, or from a single object (method step 114). This might take the form of an enquiry to a user's mobile phone, for example, giving the user a choice concerning the advertisement that they wish to see displayed, or may take the form of a question about their interests, from which a suitable advertisement is selected. For example, the billboard may be arranged to display offers on music CDs in a nearby store. A user can be asked if they wish to have displayed to them an advert for the latest CD single release. This preliminary enquiry is displayed locally on the display device of the mobile phone. If the user responds to the enquiry positively, then the appropriate advertisement is displayed and directed to the location of the user. An alternative possibility could be that the user is asked which of a short list of films they enjoyed, which, again, is displayed locally on the mobile phone. If the user responds then an advert for the CD soundtrack for the indicated film can be displayed and directed to the user.

The apparatus 8 can serve more than two users. The display means 14 must have sufficient resolution to carry the images, and the directing means is able to direct all of the different images to the different locations of the objects that are in range of the apparatus 8.

Images that are displayed by the apparatus 8 can include in them options for feedback that can be utilised from the object that the image is directed towards. So, for example, in the example where a user is presented with an advertisement for a particular holiday, the image could include in it an option for the user to request further information. If the user responds to this option then, for example, an appropriate brochure is mailed to the user's home address. Another possibility is that the advertisement includes an option to view a different advertisement, so if the user is not interested in the image displayed, then they are offered the option of cycling through alternative images until one is displayed that is more relevant to the user.

The apparatus 8 includes detecting means 26 for detecting the location of an object that is within the range of the apparatus 8 (method step 100). The detecting means operates as a short-range radio frequency transmitter of the Bluetooth standard, but could equally be a simple radar type device to discover the existence of a suitable object within range of the apparatus 8.

In addition to the directing of an image towards the user, the apparatus 8 also has the functionality to direct audio at the location of the identified objects (method step 110). This is achieved by audio reproducing means in the form of speakers 28 that can direct audio at the location of an object. The system is therefore complemented with location-specific sound, including local sound produced by ultrasound interference. Therefore, in addition to the image received by a user there exists the option for audio associated with the image to be directed to the location of the object. As with the images, there exists the possibility of multiple objects being targeted with different audio streams.

The display means 14 can also display three-dimensional images, by producing a series of images that are separated by the average width between a user's eyes that alternate between left and right eye views. It is therefore possible to provide a three-dimensional image and direct this image at a user. As before, multiple users can be targeted with such three-dimensional images, the only limitation on such an arrangement being the resolution of the display means 14.

A number of other methods of directing the image to the location of the object carried by the user are possible including motorised or optically or otherwise steerable displays that are orientated to a user. Other directing means for directing the image include a parallax barrier system, an array of holographic elements, a collimating system, a pinhole arrangement, interference filters, and prisms.

The profile that is accessed by the apparatus 8 need not be stored on the object that is within range of the apparatus 8. It is sufficient that a profile that is linked to the object, or to the user, can be accessed by the apparatus 8. Therefore, the profile may be stored on a remote server, and the apparatus 8 accesses this profile through an identification method, based upon the information it receives from the object.

The invention claimed is:

1. A method of displaying an image, comprising receiving data comprising the location of a first user device of a first user, receiving data comprising the location of a second user device of a second user, directing a first image towards the location of first user device, and directing a different second image towards the location of said second user device, the first image being substantially hidden from the second user and the second image being substantially hidden from the first user, the first and second images being directed from a same display device.

2. The method according to claim 1, wherein said first image and said second image are displayed simultaneously.

3. The method according to claim 1, and further comprising interrogating at least one of the user devices and selecting the image directed at the one user device according to a response to the interrogation.

4. The method according to claim 1, and further comprising receiving feedback from at least one of the user devices in response to one of interrogating the one user device and receiving answers to choices from at least one the users, and selecting the image directed at the one user device accordingly.

5. The method according to claim 1, wherein at least one of the images is three-dimensional.

6. The method according to claim 1, and further comprising directing audio at one or more of the user devices.

7. The method according to claim 1, comprising detecting the location of at least one of the user devices.

8. Apparatus for displaying an image, comprising receiving means for receiving data comprising the location of a first user device and for receiving data comprising the location of a second user device, a display device for displaying different first and second images, and directing means for directing said first image towards the location of said first user device while substantially hiding the first image from the second user device and for directing said second image towards the location of the second device while substantially hiding the second image from the first user device.

9. The apparatus according to claim 8, wherein said display device displays said first image and said second image simultaneously.

10. The apparatus according to claim 8, and further comprising communicating means for communicating with at least one of the user devices.

11. The apparatus according to claim 8, and further comprising audio reproduction means for directing audio at one or more of the user devices.

12. The apparatus according to claim 8, wherein said directing means is a lenticular lens array.

13. The apparatus according to claim 8, and further comprising detecting means for detecting the location of at least one of the user devices.

14. The method according to claim 1, wherein the first and second images are directed from a same display area of the same display device.

15. The method according to claim 1, wherein the first and second images are simultaneously directed from a same display area of the same display device.

16. The apparatus according to claim 8, wherein the first and second images are directed from a same display area of the display device.

17. The apparatus according to claim 8, wherein the first and second images are simultaneously directed from a same display area of the display device.

18. The method according to claim 1, further comprising providing at least one of additional information and images to at least one of the users in response to selection by the at least one of the users of choices displayed on at least one of the user devices, said choices being received from a unit associated with the same display device.

19. The method according to claim 1, further comprising cycling alternative images on the display device in response to a selection by the at least one of the users of a choice displayed on at least one of the user devices.

20. The apparatus according to claim 8, wherein said display device is configured to cycle alternative images in response to a selection by a user of at least one of the user devices of a choice displayed on the one user device.

* * * * *